Patented Dec. 7, 1948

2,455,541

UNITED STATES PATENT OFFICE 2,455,541

AIR DRY WRINKLE FINISH

William Alishire Waldie, Oakwood, Ohio, assignor to New Wrinkle, Inc., Wilmington, Del., a corporation of Delaware No Drawing. Application March 15, 1945, Serial No. 583,001

7 Claims. (Cl. 260—19)

This application relates to wrinkle finishes and more particularly to air-drying wrinkle finishes.

Heretofore wrinkle finish coatings have been prepared by applying a specific varnish to the surfaces to be coated and subsequently baking it in an oven or under the influence of infra-red light whereby the desired hardness of the film was obtained.

It is an object of this invention to provide wrinkle finish composition which, when applied to the surfaces, harden at normal room temperatures. By this the baking step is made superfluous and the production cost of such finishes is considerably decreased.

It has been found that mixtures of short oil varnishes containing approximately from 2 to 15 gallons of oil per 100 pounds of resin and an oil drier will have such desirable air-drying properties. Compounds having from 30 up to 130 gallons of oil drier per 100 gallons of short oil varnish have proven particularly suitable and have been found to yield uniform wrinkled coatings of satisfactory hardness.

The following examples of air drying wrinkle varnishes may be considered as exemplary of the compositions particularly employed in connection with the present invention.

Example I (a) A short oil varnish was first prepared by heating a mixture of 100 pounds of a rosin-modified phenol-formaldehyde resin, and four gallons of raw tung oil to 540° F. until a homogeneous dispersion of the resin was obtained. The mass was then allowed to cool down to 350° F. whereupon five gallons of xylol and 7 gallons of light petroleum naphtha were added.

(b) The oil drier was separately prepared by heating a mixture of 15 gallons of raw tung oil, four pounds of precipitated lead resinate and five pounds of precipitated cobalt resinate to 500° F. until a homogeneous mixture was obtained. The batch was then allowed to air-cool to 350° F., and 10 gallons of light gravity petroleum naphtha and 5 gallons of xylol were then added.

(c) A mixture of 7 gallons of the varnish obtained under (a) and 9 gallons of the drier obtained under (b) formed a composition which, when applied to a surface and allowed to dry at room temperature, resulted in a hard film of uniform wrinkle texture.

Example II

In this instance a wrinkle coating of black color was produced.

(a) First a short oil varnish was prepared by heating 100 pounds of rosin modified phenol formaldehyde resin with 8 gallons of raw tung oil to 540° F. until uniform dispersion was obtained, then cooling to 350° F. and adding 5 gallons of xylol and 12 gallons of light gravity petroleum naphtha.

(b) The same oil drier as described in Example I under (b) was used.

(c) A pigment paste was produced by grinding 2 pounds of carbon black and 38 pounds of asbestine with 40 pounds of the varnish obtained under (a).

(d) The air drying coating composition was finally produced by mixing 2 gallons of the varnish made according to (a) with 2 gallons of the drier and 8 pounds of the pigment paste. A coating made from this composition after air drying showed excellent wrinkle formation and was fairly hard.

Example III (a) 100 pounds of rosin modified phenol formaldehyde resin were heated with 8 gallons of liquefied oiticica oil to approximately 500 to 510° F. until homogeneous dispersion was obtained, whereupon heating was discontinued and the mass allowed to cool down to 350° F. Five gallons of xylol and 12 gallons of light gravity petroleum naphtha were then added.

(b) Fifteen gallons of liquefied oiticica oil, 4 pounds of precipitated lead resinate and 5 pounds of precipitated cobalt resinate were heated together to approximately 500° F. until complete distribution; whereupon 10 gallons of light gravity petroleum naphtha and 5 gallons of xylol were added.

A mixture of 6 gallons of the varnish obtained under (a) and of 4 gallons of the drier described under (b), when sprayed on a surface and air-dried; resulted in a film which was fairly hard and showed a satisfactory and uniform wrinkle texture.

From the examples given above it will be seen that short oil varnishes, by which expression I wish to encompass varnishes that contain from 2 to 15 gallons of oil per 100 pounds of resin, in mixture with an oil drier result in compounds which when applied to a surface dry at room temperature to form a hard film of uniform texture.

Similar to the carbon black of Example II, other pigments may be used depending upon the color desired for the finished coating. Likewise, other inert pigments known to the art besides asbestine may be added.

From the examples given it is evident that drying oils with or without conjugated double bonds yield equally comparable results. Thus, for example, soya bean oil resulted in coatings just as satisfactory for some purposes as those made with tung oil. This is a very important advantage obtained by the invention, because drying oils having non-conjugated double bonds are plentifully available from domestic sources and therefore cheaper than those with conjugated double bonds which either have to be imported or have to be prepared from non-conjugated oils by a chemical process. Conjugated double-bonded oils, such as raw tung oil, blown tung oil, liquified oiticica oil and dehydrated castor oil were found highly satisfactory.

It was also found that the hardness of the film can be controlled by cooking the oil drier to a lower or higher viscosity, driers of higher viscosities yielding a coating of greater hardness than those of lower viscosity.

It will be understood that the term "oil drier" is used in the art for a drier free from any resin in contradistinction to a Japan drier which contains resinous matter.

It will be also understood that while there have been described herein certain specific embodiments of my invention, it is not intended thereby to have the invention limited to or circumscribed by the specific details of procedures, materials, compositions or proportions herein set forth by way of example in view of the fact that this invention is susceptible to modifications according to individual preference or conditions without departing from the spirit of this disclosure and the scope of the appended claims.

I claim:

1. An air-drying wrinkle finish coating composition consisting of a mixture of 7 gallons of short oil varnish and 9 gallons of oil drier; said short oil varnish being compounded by heating to 540° F. until homogeneous 100 pounds of rosin-modified phenol formaldehyde resin and 4 gallons of raw tung oil, and then adding at 350° F. 5 gallons of xylol and 7 gallons of light gravity petroleum naphtha; and said oil drier being compounded by heating to 500° F. until homogeneous 15 gallons of raw tung oil, 4 pounds of precipitated lead resinate, 5 pounds of precipitated cobalt resinate, and then adding at 350° F. 10 gallons of light gravity petroleum naphtha and 5 gallons of xylol.

2. A black air drying wrinkle coating composition consisting of a mixture of two gallons of a short oil varnish, 2 gallons of an oil drier, and 8 pounds of a pigment paste; said short oil varnish being obtained by heating to 540° F. until homogeneous 100 pounds of rosin modified phenol formaldehyde resin and 8 gallons of raw tung oil, and then adding at 350° F. 5 gallons xylol and 12 gallons light gravity petroleum naphtha; said oil drier being obtained by heating to 500° F. until homogeneous 15 gallons of raw tung oil, 4 pounds of precipitated lead resinate, 5 pounds of precipitated cobalt resinate, and then adding at 350° F. 10 gallons of light gravity petroleum naphtha and 5 gallons of xylol; and said pigment paste being compounded of 2 pounds of carbon black, 38 pounds of asbestine and 40 pounds of said short oil varnish.

3. An air drying wrinkle finish coating composition consisting of a mixture of 6 gallons of a short-oil varnish and 4 gallons of an oil drier; said short oil varnish being obtained by heating to from 500 to 510° F. until homogeneous 100 pounds of rosin-modified phenol-formaldehyde resin and 8 gallons of liquefied oiticica oil, and then adding at 350° F. 5 gallons of xylol and 12 gallons of light gravity petroleum naphtha; and said oil drier being obtained by heating to 500° F. until homogeneous 15 gallons of liquefied oiticica oil, 4 pounds of precipitated lead resinate, 5 pounds of precipitated cobalt resinate, and then adding 10 gallons of light gravity petroleum naphtha and 5 gallons of xylol.

4. An air drying wrinkle finish coating composition consisting of a mixture of 100 parts by volume of short oil varnish and 30 to 130 parts by volume of an oil drier; said short oil varnish being obtained by heating to from 500° to 540° F. until homogeneous from 2 to 15 gallons of conjugated double-bonded drying oil selected from the group consisting of tung oil and oiticica oil with 100 lbs. of oil-soluble rosin-modified phenol formaldehyde resin; and said oil drier being obtained by heat reacting at approximately 500° F. until homogeneous a mixture of 4 pounds of lead resinate and 5 pounds of cobalt resinate with from 10 to 20 gallons of said conjugated double-bonded drying oil and by then adding hydrocarbon thinner at 350° F.

5. An air drying wrinkle finish coating composition consisting of a mixture of 100 parts by volume of short oil varnish and 30 to 130 parts by volume of an oil drier; said short oil varnish being obtained by heating to from 500° to 540° F. until homogeneous from 2 to 15 gallons of conjugated double-bonded drying oil selected from the group consisting of tung oil and oiticica oil with 100 lbs. of oil soluble rosin-modified phenol formaldehyde resin; and said oil drier being obtained by heat reacting at approximately 500° F., until homogeneous, a mixture of 4 pounds of lead resinate and 5 pounds of cobalt resinate with 15 gallons of said conjugated double-bonded drying oil and by then adding hydrocarbon thinner at 350° F.

6. An air drying wrinkle finish coating composition consisting of a mixture of 100 parts by volume of short oil varnish, 30 to 130 parts by volume of an oil drier and pigment; said short oil varnish being obtained by heating to from 500° to 540° F. until homogeneous from 2 to 15 gallons of conjugated double-bonded drying oil selected from the group consisting of tung oil and oiticica oil with 100 lbs. of oil-soluble rosin-modified phenol formaldehyde resin; and said oil drier being obtained by heat reacting at approximately 500° F., until homogeneous, a mixture of 4 pounds of lead resinate and 5 pounds of cobalt resinate with from 10 to 20 gallons of said conjugated double-bonded drying oil and by then adding hydrocarbon thinner at 350° F.

7. A method of preparing an air drying wrinkle finish coating composition consisting of mixing 100 parts by volume of short oil varnish and 30 to 130 parts by volume of an oil drier; said short oil varnish being obtained by heating to from 500° to 540° F. until homogeneous from 2 to 15 gallons of conjugated double-bonded drying oil selected from the group consisting of tung oil and oiticica oil with 100 lbs. of oil-soluble rosin-modified phenol formaldehyde resin; and said oil drier being obtained by heat reacting at approximately 500° F. until homogeneous a mixture of 4 pounds of lead resinate and 5 pounds of cobalt resinate with from 10 to 20 gallons of said conjugated double-bonded drying oil and by then adding hydrocarbon thinner at 350° F.

WILLIAM ALLSHIRE WALDIE.

(References on following page)

REFERENCES CITED

The following references are of record in the file of this patent:

UNITED STATES PATENTS

| Number | Name | Date |
|---|---|---|
| 1,864,763 | Root | June 28, 1932 |
| 1,976,191 | Root | Oct. 9, 1934 |
| 2,077,112 | Kittredge | Apr. 13, 1937 |
| 2,308,595 | Drummond | Jan. 19, 1943 |

FOREIGN PATENTS

| Number | Country | Date |
|---|---|---|
| 547,287 | Great Britain | Aug. 20, 1942 |

OTHER REFERENCES

Bottler (transl. by Sabin), German and American Varnish Making, Wiley, 1912, pp. 66, 251, 253. (Copy in Division 64.)